US012512572B2

(12) United States Patent
Tamiazzo et al.

(10) Patent No.: US 12,512,572 B2
(45) Date of Patent: Dec. 30, 2025

(54) FILTERS INCLUDING DUAL CROSS-COUPLINGS AND RELATED COMBINERS

(71) Applicant: COMMSCOPE ITALY S.R.L., Agrate Brianza (IT)

(72) Inventors: Stefano Tamiazzo, Milan (IT); Gabriele Burato, Cinisello Balsamo (IT); Stefano Accarino, Milan (IT)

(73) Assignee: CommScope Italy S.r.l., Agrate Brianza (IT)

( * ) Notice: Subject to any disclaimer, the term of this patent is extended or adjusted under 35 U.S.C. 154(b) by 170 days.

(21) Appl. No.: 18/558,465

(22) PCT Filed: May 10, 2022

(86) PCT No.: PCT/EP2022/062630

§ 371 (c)(1),
(2) Date: Nov. 1, 2023

(87) PCT Pub. No.: WO2022/238396

PCT Pub. Date: Nov. 17, 2022

(65) Prior Publication Data

US 2024/0222832 A1 Jul. 4, 2024

(30) Foreign Application Priority Data

May 11, 2021 (IT) ........................ 102021000012101

(51) Int. Cl.
*H01P 1/207* (2006.01)
*H01P 5/16* (2006.01)

(52) U.S. Cl.
CPC ................ *H01P 1/207* (2013.01); *H01P 5/16* (2013.01)

(58) Field of Classification Search
CPC .. H01P 1/207; H01P 5/16; H01P 1/213; H01P 1/2056
See application file for complete search history.

(56) References Cited

U.S. PATENT DOCUMENTS 5,608,363 A 3/1997 Cameron et al.
10,236,500 B2 3/2019 Zhamu et al.
(Continued)

FOREIGN PATENT DOCUMENTS

CN 103247840 B 9/2015
CN 112216938 A 1/2021
(Continued)

OTHER PUBLICATIONS

International Search Report and Written Opinion corresponding to PCT/EP2022/062630; Date of Mailing: Sep. 8, 2022 (16 pages).
(Continued)

*Primary Examiner* — Andrea Lindgren Baltzell
*Assistant Examiner* — Kimberly E Glenn
(74) *Attorney, Agent, or Firm* — Myers Bigel, P.A.

(57) ABSTRACT

Filters include first through fourth resonant cavities, an input that extends into the first resonant cavity, and an output that extends from the fourth resonant cavity. The first resonant cavity is configured to couple with the second and third resonant cavities, the second resonant cavity is configured to couple with the third and fourth resonant cavities, and the third resonant cavity is configured to couple with the fourth resonant cavity. A magnitude of the coupling between the first and third resonant cavities is configured to be substantially equal to a second magnitude of the coupling between the second and fourth resonant cavities. Combiners that include such filters are also provided.

21 Claims, 6 Drawing Sheets

(56) References Cited

U.S. PATENT DOCUMENTS

| | | | | |
|---|---|---|---|---|
| 2009/0041157 | A1 | 2/2009 | Small | |
| 2021/0336313 | A1* | 10/2021 | Park | H01P 1/20 |

FOREIGN PATENT DOCUMENTS

| | | | | | |
|---|---|---|---|---|---|
| GB | 2507668 | A | * | 5/2014 | H01P 1/205 |
| WO | 2020145590 | A1 | | 7/2020 | |

OTHER PUBLICATIONS

Italian Search Report corresponding to IT 102021000012101; Dated: Jan. 24, 2022 (25 pages).

* cited by examiner

FILTERS INCLUDING DUAL CROSS-COUPLINGS AND RELATED COMBINERS

CROSS-REFERENCE TO RELATED APPLICATIONS

This application is a 35 U.S.C. § 371 national phase application of International Application Serial No. PCT/EP2022/062630, filed May 10, 2022, which claims priority to Italian Patent Application Serial No. 102021000012101, filed May 11, 2021, the entire contents of which are incorporated herein by reference.

BACKGROUND

The present invention relates generally to communications systems and, more particularly, to filters that are suitable for use in cellular communications systems.

Filters are electronic devices that selectively pass signals based on the frequency of the signal. Various types of filters are used in cellular communications systems. As new generations of cellular communications services have been introduced—typically without phasing out existing cellular communications services—both the number and types of filters that are used has expanded significantly. Filters may be used, for example, to allow radio frequency ("RF") signals in different frequency bands to share selected components of a cellular communications system and/or to separate RF data signals from power and/or control signals. As the number of filters used in a typical cellular communications system has proliferated, the need for smaller, lighter and/or less expensive filters has increased.

The "response" of a filter refers to the amount of energy that passes from a first port of the filter to other port(s) of the filter as a function of frequency. A filter response will typically include one or more passbands, which are frequency ranges where the filter passes signals with relatively small amounts of attenuation. A filter response also typically includes one or more stopbands. A stopband refers to a frequency range where the filter will substantially not pass signals, usually because the filter is designed to reflect backwards any signals that are incident on the filter in this frequency range. In some applications, it may be desirable that the filter response exhibit a high degree of "local selectivity," meaning that the transition from a passband to an adjacent stopband occurs over a narrow frequency range. Resonant cavity filters are typically used in applications where the filter response must exhibit a high degree of local selectivity. One technique for enhancing local selectivity is to add transmission zeros in the filter response. A "transmission zero" refers to a portion of a filter frequency response where the amount of signal energy that passes is very low.

One type of filter that is used in cellular communications applications is the so-called low-loss combiner. A low-loss combiner is a three-port device that is used to combine signals in two closely-adjacent frequency bands for RF signals passing in a first direction through the device, and to decompose a composite signal into its spectral components for RF signals passing in the opposite direction through the device. A low-loss combiner therefore includes first and second frequency selective ports that each only pass RF signals in selected first and second frequency ranges and a common port that passes signals in both the first and second frequency ranges. A low-loss combiner is a specific type of diplexer, with the term low-loss combiner typically being used to describe a diplexer that operates on RF signals in two very closely spaced frequency bands. One common application for low-loss combiners is for base stations that include base station antennas that are shared by two cellular operators. In this application, the frequency selective ports of the low-loss combiner may be connected to first and second radios that are provided by the respective cellular operators, and the common port of the low-loss combiner may be coupled to a port on the shared base station antenna.

FIG. 1 is a schematic block diagram of a conventional low-loss combiner 10. As shown in FIG. 1, the combiner 10 includes a first frequency selective port 12, a second frequency selective port 14, a common port 16 and a termination 18. The combiner 10 further includes a pair of 90° hybrid couplers 20-1, 20-2 and a pair of bandpass filters 30-1, 30-2 that are contained within a housing 50. The first frequency selective port 12, the second first frequency selective port 14 and the common port 16 may be implemented as connector ports that extend through the housing 50 and that are configured to mate with external connectorized cables (not shown), or as openings in the housing 50 that receive un-connectorized cables (not shown) that are electrically connected to components of the combiner 10. The combiner 10 further includes a first transmission line 40-1 that electrically connects the first frequency selective port 12 to a first port 22-1 of the first 90° hybrid coupler 20-1, a second transmission line 40-2 that electrically connects the second frequency selective port 14 to a first port 22-1 of the second 90° hybrid coupler 20-2, a third transmission line 40-3 that electrically connects a fourth port 22-4 of the first 90° hybrid coupler 20-1 to the common port 16, and a fourth transmission line 40-4 that electrically connects a fourth port 22-4 of the second 90° hybrid coupler 20-2 to the termination 18. The termination 18 may comprise, for example, a resistor that is coupled to electrical ground. The first bandpass filter 30-1 is coupled between a second port 22-2 of the first 90° hybrid coupler 20-1 and a second port 22-2 of the second 90° hybrid coupler 20-2. The second bandpass filter 30-2 is coupled between a third port 22-3 of the first 90° hybrid coupler 20-1 and a third port 22-3 of the second 90° hybrid coupler 20-2.

It should be noted that it is possible to implement the combiner 10 using high pass filters. Herein, the term "bandpass filter" is used broadly to encompass both filters that pass only a discrete "pass band" frequency range of RF signals while blocking RF signals at frequencies both above and below the discrete pass band frequency range and filters that pass all RF signals that are above a particular frequency (or small transition frequency range) while blocking RF signals at frequencies below the particular frequency.

In some cases, the first and second frequency selective ports 12, 14 should be configured to have pass bands that are very close to each other. In one example application, the first frequency selective port 12 should be configured to pass signals in a first pass band that comprises the 3400-3560 MHz frequency band and the second frequency selective port 14 should be configured to pass signals in a second pass band that comprises the 3560-3600 MHz frequency band. Since the pass bands for the first and second frequency selective ports 12, 14 are immediately adjacent each other, the bandpass filters 30-1, 30-2 in combiner 10 need to exhibit a high degree of selectivity so that very little RF energy from the first frequency selective port 12 may pass to the second frequency selective port 14 and vice versa. In fact, one very important performance parameter for a low-loss combiner is the isolation between the first and second frequency selective ports 12, 14, where the isolation is defined as the fraction of RF power fed into the first frequency selective port 12, at any frequency in the first pass band, that leaks to the second frequency selective port 14, and as the fraction of RF power fed into the second frequency selective port 14, at any frequency in the second pass band, that leaks to the first frequency selective port 12. A typical isolation goal is −30 dB (i.e., the magnitude of the RF energy that leaks to the isolated port is 30 dB below the magnitude of the original RF signal) at all frequencies in the first and second pass bands.

SUMMARY

Pursuant to embodiments of the present invention, filters are provided that include first through fourth resonant cavities, an input that extends into the first resonant cavity, and an output that extends from the fourth resonant cavity. The first resonant cavity is configured to couple with the second and third resonant cavities, the second resonant cavity is configured to couple with the third and fourth resonant cavities, and the third resonant cavity is configured to couple with the fourth resonant cavity. A magnitude of the coupling between the first and third resonant cavities is configured to be substantially equal to a magnitude of the coupling between the second and fourth resonant cavities. The couplings between the first and third resonant cavities and between the second and fourth resonant cavities may be generated using a coupling element.

Pursuant to further embodiments of the present invention, filters are provided that include first through fourth resonant cavities having respective first through fourth resonators mounted therein, where the first resonator is closer to the second and fourth resonators than it is to the third resonator and the second resonator is closer to the first and third resonators than it is to the fourth resonator. These filters also include an input that is configured to feed RF signals from a first external circuit element into the first resonant cavity and an output that is configured to pass RF signals from the fourth resonant cavity to a second external circuit element. The filters also include a coupling element that extends between the first and third resonant cavities and between the second and fourth resonant cavities to provide a pair of cross-couplings.

The above filters may optionally be configured to couple the first resonant cavity to the fourth resonant cavity. The resonant cavities in any of the filters according to embodiments of the present invention may be positioned to define a rectangle or a square in some cases. In such embodiments, the first and third resonant cavities may be arranged at opposed corners of the rectangle/square. In some embodiments, the filters may include fifth and sixth resonant cavities. In such embodiments, the first through sixth second resonant cavities may be arranged in numerical order to define a main coupling path through the filter, and additional cross-couplings may be provided between the second and sixth resonant cavities and between the third and fifth resonant cavities.

The coupling element in the above-described filters may include a first conductive line that extends between the first and third resonant cavities and a second conductive line that extends between the second and fourth resonant cavities. In some embodiments, each of the first and second conductive lines may include first and second end portions that are electrically coupled to the housing. In some embodiments, a first segment of the first conductive line may cross a first segment of the second conductive line without physically contacting the first segment of the second conductive line. The first and second conductive lines may comprise a monolithic structure or may be implemented as separate lines. In some embodiments, at least one of the first and second conductive lines may have an S-shape.

The above described filters may be bandpass filters in some embodiments. The filters may be used in combiners.

Pursuant to still further embodiments of the present invention, low-loss combiners are provided that include a first frequency selective port, a second frequency selective port, a common port and a termination. These combiners further include first and second bandpass filters that are each coupled to the first frequency selective port, the second frequency selective port and the common port. The first and second bandpass filters may be any of the bandpass filters according to embodiments of the present invention. In some embodiments, each bandpass filter may include an input, an output and first through fourth resonant cavities, where the first resonant cavity is configured to couple with the input and the second and third resonant cavities, the second resonant cavity is configured to couple with the third and fourth resonant cavities, and the fourth resonant cavity is configured to couple with the third resonant cavity and the output.

In some embodiments, the combiners may further include a first hybrid coupler coupled between the first frequency selective port and the common port and a second hybrid coupler coupled between the second frequency selective port and the termination. The first and second bandpass filters are each coupled between the first hybrid coupler and the second hybrid coupler. In some embodiments, the first and second bandpass filters may have substantially the same design and substantially the same pass bands. Moreover, a magnitude of the coupling between the first and third resonant cavities in each bandpass filter may be configured to be substantially equal to a magnitude of the coupling between the second and fourth resonant cavities of the bandpass filter.

Figure 1:
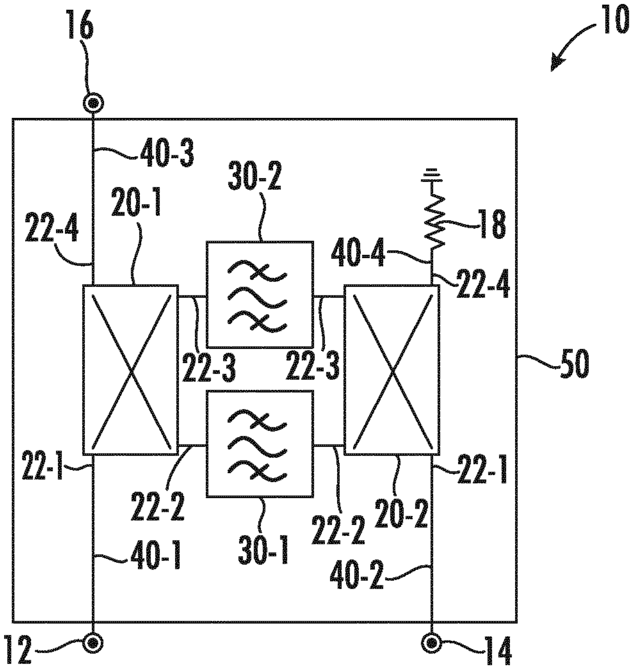
FIG. 1 is a schematic block diagram of a conventional low-loss combiner.

Note that herein when multiple of the same elements or structures are provided, they may be referred to in some instances using two-part reference numerals, where the two parts are separated by a dash. Herein, such elements may be referred to individually by their full reference numeral (e.g., element xxx-x) and may be referred to collectively by the first part of the applicable reference numeral (e.g., element xxx).

DETAILED DESCRIPTION

In order achieve high degrees of isolation, the two bandpass filters in the low-loss combiner 10 of FIG. 1 need to have essentially identical frequency responses. While achieving essentially identical frequency responses may be difficult at any frequency range, it can be particularly challenging when the first and second pass bands are at relatively high frequencies, since variations in physical dimensions are a larger percentage of a wavelength at higher frequencies, and hence have a greater impact on the response. A wide variety of factors can cause the frequency responses of the two pass band filters to differ including, for example, component manufacturing tolerances, tuning inaccuracies, post-tuning filter assembly operations, unequal frequency drift between the filters as a function of temperature and/or humidity, differing effects of vibrations, etc.

Figure 2:
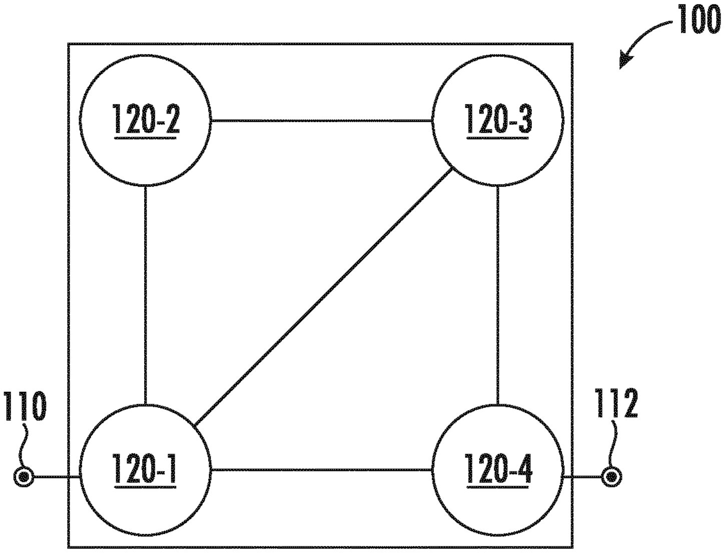
FIG. 2 is a schematic diagram illustrating a filter design that can be used to implement the bandpass filters included in the conventional low-loss combiner of FIG. 1.

FIG. 2 is a schematic diagram illustrating a conventional design for a bandpass filter 100 that can be used to implement the bandpass filters 30-1, 30-2 included in the conventional low-loss combiner 10 of FIG. 1. As shown in FIG. 2, the bandpass filter 100 includes an input 110, an output 112 and four resonant cavities 120-1 through 120-4 that are coupled between the input 110 and the output 112. A resonator (not shown) may be mounted in each resonant cavity 120. The resonant cavities 120 are designed so that coupling occurs between the resonant cavities 120 (and the resonators therein), with each solid line extending between two resonant cavities 120 in FIG. 2 indicating a coupling path. Thus, it can be seen that the first and third resonant cavities 120-1, 120-3 each couple with the remaining three resonant cavities 120, while the second and fourth resonant cavities 120-2, 120-4 each only couple with the first and third resonant cavities 120-1, 120-3, but not with each other. This configuration provides four poles and two transmission zeros, and hence can provide good selectivity. Note that the conventional bandpass filter 100 could include a coupling path between the second and fourth resonant cavities 120-2, 120-4 instead of between the first and third resonant cavities 120-1, 120-3 and provide a comparable frequency response.

The couplings between the first and second resonant cavities 120-1, 120-2, between the second and third resonant cavities 120-2, 120-3, and between the third and fourth resonant cavities 120-3, 120-4 are typically referred to as "main" couplings as they provide a main signal transmission path between the input 110 and the output 112. The couplings between the first and third resonant cavities 120-1, 120-3 and between the first and fourth resonant cavities 120-1, 120-4, which are not along the main signal transmission path, are typically referred to as cross-couplings. The cross-couplings may be used to generate the transmission zeros.

Unfortunately, the frequency response of low-loss combiner 10 may be very sensitive to any differences between the resonant frequencies of the second resonant cavities 120-2 of the two bandpass filters 100, and to any differences between the resonant frequencies of the third resonant cavities 120-3 of the two bandpass filters 100. In particular, differences in the resonant frequencies of the two second resonant cavities 120-2 or in the resonant frequencies of the two third resonant cavities 120-3 act to degrade the isolation performance of the low-loss combiner 10. Other mismatches between the two bandpass filters 100 included in low-loss combiner 10 (e.g., differences in the resonant frequencies of the two first resonant cavities 120-1, differences in the resonant frequencies of the two fourth resonant cavities 120-4, differences in the magnitudes of any of the same coupling paths in the two filters, etc.) tend to contribute much less to degradation in the isolation performance of the low-loss combiner 10.

As an example, consider a low-loss combiner 10 that is designed to have a first pass band of 3400-3599 MHz and a second pass band of 3600-4000 MHz that is implemented using two "identical" bandpass filters 30 that each have the design of the bandpass filter 100 of FIG. 2 and pass the 3600-4000 MHz band. In such a design, the second resonant cavity 120-2 in each bandpass filter 100 would be tuned to about 3600 MHz (i.e., tuned to the transition point between the first and second pass bands of the combiner 10).

Figure 3:
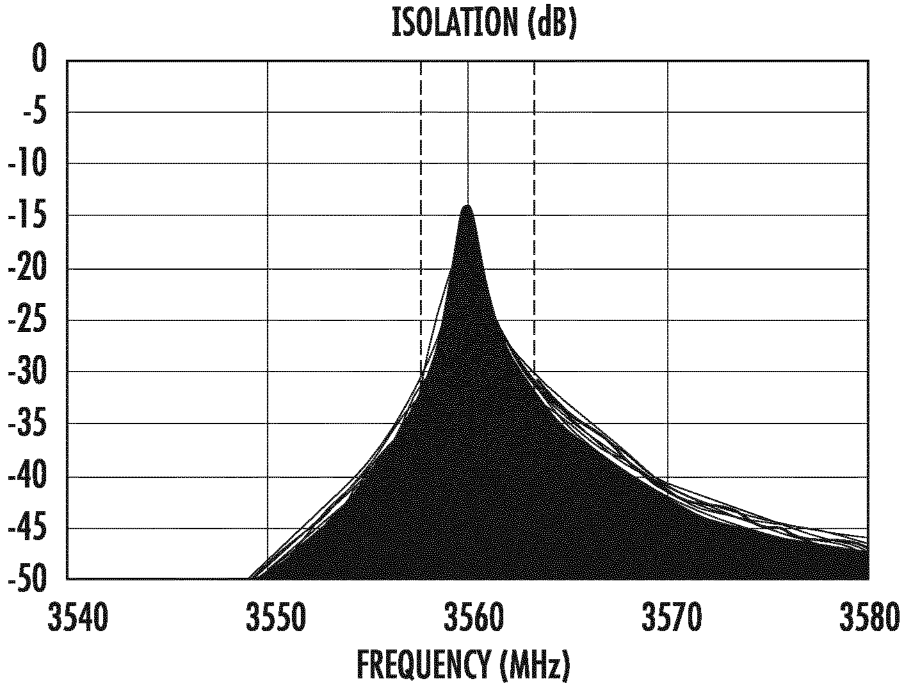
FIG. 3 is a graph illustrating the isolation performance of a low-loss combiner implemented using bandpass filters having the design shown in FIG. 2 as determined by a ten-thousand sample Monte Carlo analysis of a normal distribution of resonant frequencies for the second and third resonant cavities of the filters having a variance of 75 kHz and an average equal to their nominal value as prescribed by filter synthesis process.

Due to differences in the physical dimensions of the resonant cavities 120, the resonators, tuning screws and the like that result from manufacturing tolerances, small differences in tuning and various other differences, the resonant frequencies of the second resonant cavity 120-2 in each bandpass filter 100 will typically not be identical. Instead, some level of variation will be present. The same is true with respect to the third resonant cavity 120-3 in each bandpass filter 100. A 10,000-sample Monte Carlo simulation was performed to estimate the isolation performance of a combiner 10 that includes two of the bandpass filters 100 where it was assumed that resonant cavities 120-2 and 120-3 in each of the two bandpass filters 100 (i.e., four resonant cavities total) are varied using a normal (Gaussian) distribution with a variance of 75 kHz and a null mean value. As the variation in the resonant frequencies of the second and third resonant cavities 120-2, 120-3 tends to drive the isolation performance of the combiner 10, it was assumed that there were no other variations in the components/response of the two bandpass filters 100. The results of this Monte Carlo simulation are provided in the graph of FIG. 3. As shown in FIG. 3, the Monte Carlo simulation predicts that some percentage of the combiners will have less than 30 dB of isolation in a 5.5 MHz frequency band centered about 3560 MHz.

Pursuant to embodiments of the present invention, bandpass filters and low-loss combiners (and other diplexers) including such bandpass filters are provided that exhibit improved performance. The bandpass filters according to embodiments of the present invention may include a different coupling scheme between the resonant cavities that desensitizes the isolation performance of the combiner with respect to the resonant frequencies of the second and third resonant cavities. The sensitivity may be reduced, for example, by almost 40% in an example embodiment, thereby reducing the frequency range where isolation greater than −30 dB may be expected.

In some embodiments, the bandpass filters may have four resonant cavities that may be arranged in the general shape of a rectangle, with the first resonant cavity (which is coupled to the input of the bandpass filter) being adjacent the fourth resonant cavity (which is coupled to the output of the bandpass filter) along the perimeter of the rectangle. Each resonant cavity may couple with adjacent resonant cavities along the perimeter of the rectangle. In addition, the second resonant cavity may couple with the fourth resonant cavity along a first diagonal of the rectangular arrangement of the resonant cavities, and the first resonant cavity may couple with the third resonant cavity along a second diagonal of the rectangular arrangement of the resonant cavities. The magnitude of the coupling between the second resonant cavity and the fourth resonant cavity may be approximately equal to the magnitude of the coupling between the first resonant cavity and the third resonant cavity. Such a filter may have an appropriate frequency response for the bandpass filter while reducing the sensitivity of combiners that include two of the bandpass filters to small differences in the frequency responses of the two bandpass filters.

In other embodiments, the filters may again include at least first through fourth resonant cavities with an input coupled to the first resonant cavity and an output coupled to the fourth resonant cavity. The first resonant cavity is configured to couple with the second and third resonant cavities, the second resonant cavity is configured to couple with the third and fourth resonant cavities, and the third resonant cavity is configured to couple with the fourth resonant cavity. A magnitude of the coupling between the first and third resonant cavities is configured to be substantially equal to a magnitude of the coupling between the second and fourth resonant cavities.

In still other embodiments, the filters may include first through fourth resonant cavities having respective first through fourth resonators mounted therein, where the first resonator is closer to the second and fourth resonators than it is to the third resonator and the second resonator is closer to the first and third resonators than it is to the fourth resonator. These filters also include an input that is configured to feed RF signals from a first external circuit element into the first resonant cavity and an output that is configured to pass RF signals from the fourth resonant cavity to a second external circuit element. These filters also include a coupling element that extends between the first and third resonant cavities and between the second and fourth resonant cavities.

The bandpass filters according to embodiments of the present invention may be used in diplexers such as low-loss combiners. These combiners may include a first frequency selective port, a second frequency selective port, a common port and a termination. The combiners may further include first and second 90° hybrid couplers and a pair of bandpass filters according to embodiments of the present invention.

Embodiments of the present invention will now be discussed in greater detail with reference to FIGS. 4-9.

Figure 4:
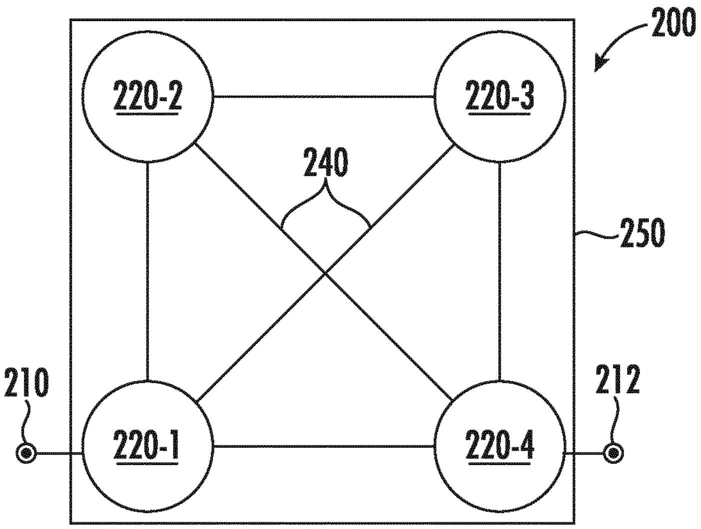
FIG. 4 is a schematic diagram illustrating a design of a bandpass filter according to embodiments of the present invention.

FIG. 4 is a schematic diagram illustrating the design of a bandpass filter 200 according to embodiments of the present invention. As shown in FIG. 4, the bandpass filter 200 includes an input 210, an output 212, and first through fourth resonant cavities 220-1 through 220-4 that are coupled between the input 210 and the output 212. The input 210 may be coupled to a first external circuit element (not shown), and the output 212 may be coupled to a second external circuit element (not shown). The input 210 may be configured to feed RF signals into the first resonant cavity 220-1, and the output 212 may be configured to feed RF signals out of the fourth resonant cavity 220-4. The resonant cavities 220 may be formed within a housing 250 of the bandpass filter 200. A respective resonator (not shown, but see FIG. 7) is mounted in each resonant cavity 220. The resonant cavities 220 are designed so that coupling occurs between the resonant cavities 220, with each solid line in FIG. 4 indicating a coupling path. As shown, each resonant cavity 220 may be configured to couple with each of the other three resonant cavities 220.

The couplings between the first and second resonant cavities 220-1, 220-2, between the second and third resonant cavities 220-2, 220-3, and between the third and fourth resonant cavities 220-3, 220-4 comprise the main couplings, while the couplings between the first and third resonant cavities 220-1, 220-3, between the second and fourth resonant cavities 220-2, 220-4 and between the first and fourth resonant cavities 220-1, 220-4 comprise cross-couplings. This configuration provides four poles and two transmission zeros. It should be noted that the coupling path between the first and fourth resonant cavities 220-1, 220-4 may be omitted in some embodiments and that the omission of this coupling path does not have a significant impact on the frequency response.

The above described main couplings may be generated by including respective coupling windows between the first and second resonant cavities 220-1, 220-2, between the second and third resonant cavities 220-2, 220-3, between the third and fourth resonant cavities 220-3, 220-4. A coupling window may optionally be provided between the first and fourth resonant cavities 220-1, 220-4. The bandpass filter 200 may include a coupling element 240 that implements the cross-couplings between the first resonant cavity 220-1 and the third resonant cavity 220-3 and between the second resonant cavity 220-2 and the fourth resonant cavity 220-4. The coupling element 240 may be designed so that the magnitude of the coupling between the first resonant cavity 220-1 and the third resonant cavity 220-3 is substantially equal to the magnitude of the coupling between the second resonant cavity 220-2 and the fourth resonant cavity 220-4.

The resonant cavities 220 of bandpass filter 200 are illustrated in FIG. 4 as being arranged in a square configuration. The first and third resonant cavities 220-1, 220-3 are arranged at opposed corners of the square, and the second and fourth resonant cavities 220-2, 220-4 are also arranged at opposed corners of the square. Embodiments of the present invention are not limited thereto. It will be appreciated that the resonant cavities 220 may have any arrangement so long as the coupling paths illustrated in FIG. 4 are provided between the resonant cavities 220. Thus, for example, the resonant cavities 220 may be arranged in a rectangular arrangement, a parallelogram arrangement, along the circumference of a circle, along an arc or in any other symmetrical or non-symmetrical arrangement in other embodiments. The arrangement shown in FIG. 4 or other symmetrical arrangements with closely spaced resonant cavities may be preferred for most efficiently utilizing space and/or for facilitating implementation of the coupling paths between resonant cavities 220.

As shown in FIG. 4, in the bandpass filter 200, the first resonator (which is in the center of the first resonant cavity 220-1) is closer to the second resonator (which is in the center of the second resonant cavity 220-2) and to the fourth resonator (which is in the center of the fourth resonant cavity 220-4) than it is to the third resonator (which is in the center of the third resonant cavity 220-3). Likewise, the second resonator is closer to the first and third resonators than it is to the fourth resonator. Thus, cross-couplings are provided between the pairs of resonators 220 that are farthest apart.

While the above description focuses on bandpass filters that include a plurality of resonant cavities, it will be appreciated that embodiments of the present invention are not limited thereto. For example, in other embodiments, the bandpass filter of FIG. 4 may be implemented as an inline filter that includes a plurality of resonators that are mounted within a single, large resonant cavity as described, for example, in U.S. Pat. No. 10,236,500, the entire content of which is incorporated herein by reference. In such a filter, the resonators may be generally aligned in a row (or in a staggered row) in numerical order (with the input to the filter coupled to the first resonator and the output of the filter coupled to the last resonator) with the main couplings generated between the first and second resonators, the second and third resonators, and the third and fourth resonators, and the cross-couplings between the first and third resonators, the second and fourth resonators and the first and fourth resonators (if provided) implemented using, for example, conductive lines.

Figure 5:
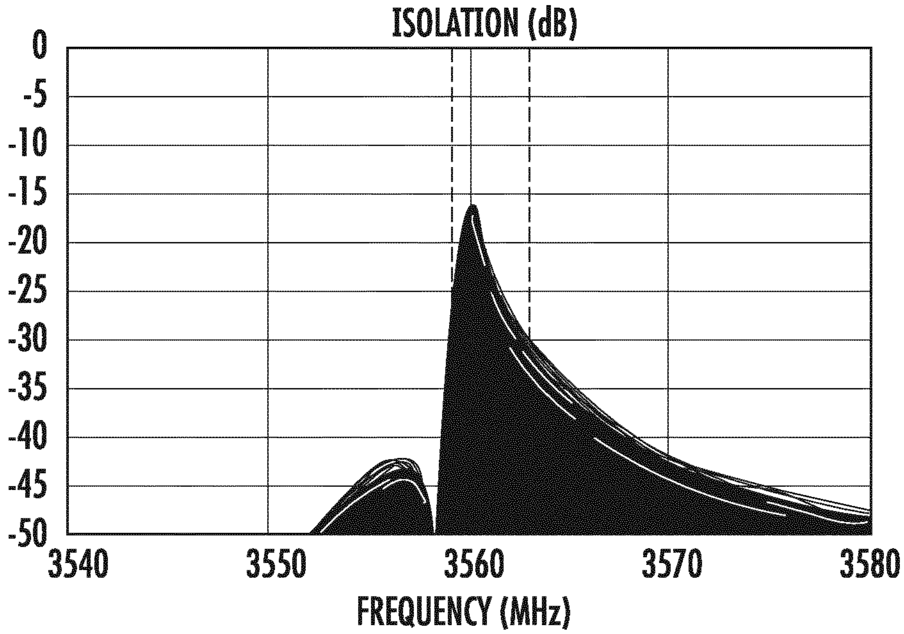
FIG. 5 is a graph illustrating the isolation performance of a low-loss combiner implemented using bandpass filters having the design shown in FIG. 4 as determined by a ten-thousand sample Monte Carlo analysis of a normal distribution of resonant frequencies for the second and third resonant cavities of the filters having a variance of 75 kHz and an average equal to their nominal value as prescribed by filter synthesis process.

FIG. 5 is a graph illustrating the isolation performance of a low-loss combiner implemented using the bandpass filters 200 of FIG. 4 as determined by a ten-thousand sample Monte Carlo analysis of a normal distribution of resonant frequencies for the second and third resonant cavities of the filters having a variance of 75 kHz. In other words, the same Monte Carlo simulation was used to generate FIG. 5 as was used to generate FIG. 3 so that the two Monte Carlo simulations provide a comparison of the isolation performance of low-loss combiners implemented using either the bandpass filters 100 of FIG. 2 or the bandpass filters 200 of FIG. 4 as a function of expected variation in the resonant frequencies of the second and third resonant cavities (i.e., the resonant cavities that are not directly connected to an input or an output) of the bandpass filters 100, 200. As shown in FIG. 5, the portion of the operating frequency band of the bandpass filter 200 that has isolation levels greater than −30 dB is reduced to about 4.0 MHz as compared to about 5.5 MHz with the conventional bandpass filter 100. Thus, use of the bandpass filters 200 may improve the isolation performance of a low-loss combiner against small random perturbations of resonant frequencies of specific resonant cavities.

Figure 6:
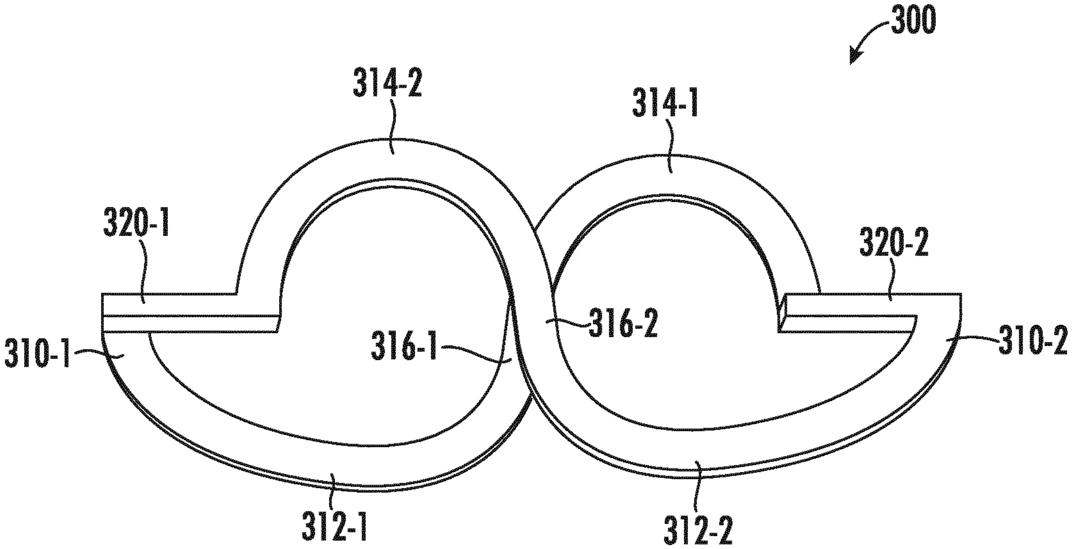
FIG. 6 is a perspective view of an example coupling element according to embodiments of the present invention.

A wide variety of different structures may be used to implement the coupling element 240 included in the bandpass filter 200. FIG. 6 is a perspective view of an example coupling element 300 according to embodiments of the present invention that may be used to implement the coupling element 240.

As shown in FIG. 6, the coupling element 300 may comprise a three-dimensional closed metal loop that includes a pair of grounded strip lines 310-1, 310-2 that each extend between a pair of resonant cavities 220 of the filter 200. The coupling element 300 further includes a pair of blocks 320-1, 320-2 that are configured to be electrically connected to the filter housing 250 in order to be electrically grounded. Each grounded strip line 310-1, 310-2 may have a curved shape (a general S-shape in the depicted embodiment). A first portion 312-1 of strip line 310-1 may extend into the second resonant cavity 220-2 of filter 200 and a second portion 314-1 of strip line 310-1 may extend into the fourth resonant cavity 220-4 of filter 200. A first portion 312-2 of strip line 310-2 may extend into the third resonant cavity 220-3 of filter 200 and a second portion 314-2 of strip line 310-2 may extend into the first resonant cavity 220-1 of filter 200. Each strip line 310-1, 310-2 further includes a respective cross-over portion 316-1, 316-2 where the two strip lines 310-1, 310-2 cross over each other viewed along an axis that is perpendicular to the center of each respective cross-over portion 316-1, 316-2. The cross-over portions 316-1, 316-2 are spaced apart from each other along the above-described axis so that the cross-over portions 316-1, 316-2 do not physically contact each other.

Figure 7:
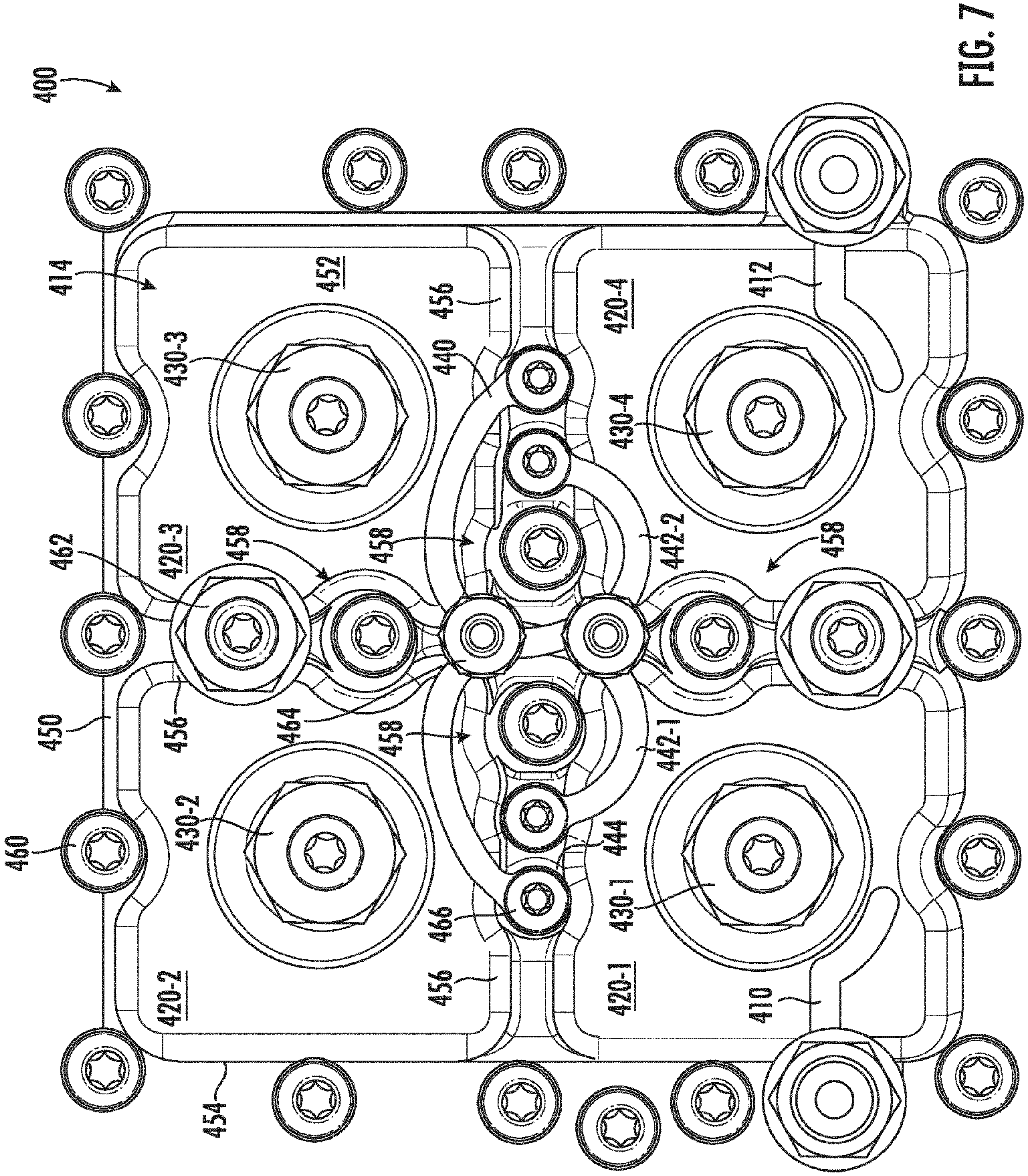
FIG. 7 is a top view of a bandpass filter according to embodiments of the present invention with the filter covers removed.
Figure 8:
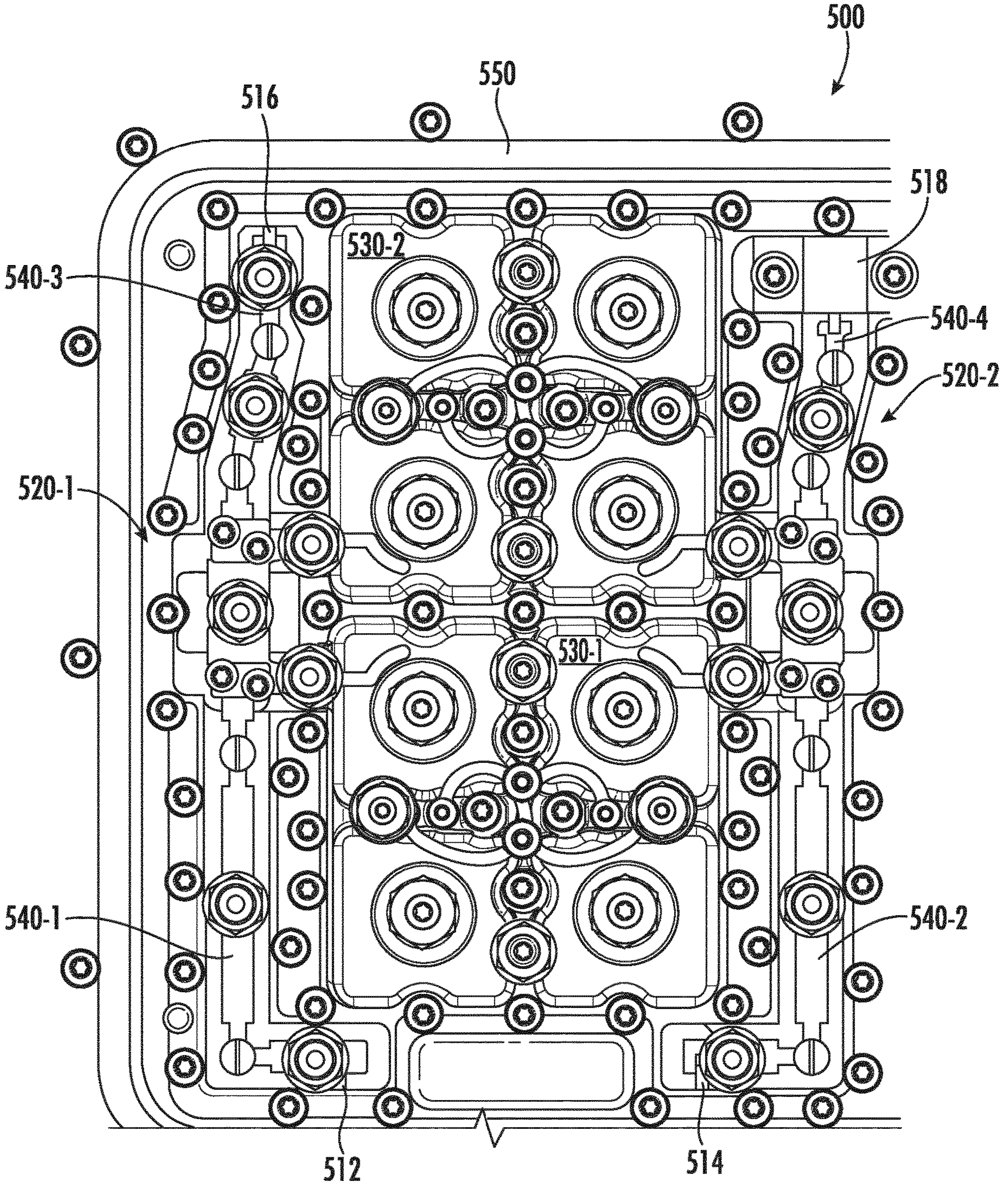
FIG. 8 is a top view of a combiner according to embodiments of the present invention (with the cover removed) that includes two of the bandpass filters of FIG. 7.

FIG. 7 is a top view of a bandpass filter 400 according to embodiments of the present invention with the filter covers thereof removed. The bandpass filter 400 may be implemented as a standalone unit or may be implemented as a portion of a low-loss combiner, in which case the housing for the combiner may also serve as the housing 450 for the bandpass filter 400. In the case of a standalone unit, it is the frequency response of the filter that benefits from the advantages that isolation benefits from in the case of a low-loss combiner. FIG. 8 (discussed below) depicts a low-loss combiner that includes two of the bandpass filters 400.

The bandpass filter 400 includes an input 410, an output 412 and a housing 450. The housing 450, along with the covers (not shown), define an internal cavity 414. The internal cavity 414 is divided into a plurality of resonant cavities 420, and a respective resonator 430 is mounted in each resonant cavity 420. A coupling element 440 is provided that facilitates coupling between selected pairs of resonant cavities 420 (and the resonators 430 therein).

The housing 450 may comprise a die cast metal housing having a floor 452 as well as outer sidewalls 454 and inner walls 456 that extend upwardly from the floor 452. Note that if the bandpass filter 400 is formed as part of a larger low-loss combiner (see FIG. 8), then at least some of the outer sidewalls 454 may comprise inner sidewalls of the low-loss combiner. The bandpass filter 400 may further comprise a pair of covers (not shown) that cover the top of the housing 450. These covers may include an inner cover that may be mounted on the upper surfaces of the outer sidewalls 454 and inner walls 456 by a plurality of fixing screws 460. Tuning screws or other tuning elements (not shown) that are associated with each resonator 430 may be mounted in the inner cover in a manner known to those of skill in the art. For example, tuning screws may be coaxially aligned with each resonator 430 so that the depth to which the tuning screws extend into the cavity 414 (and into an open interior of the respective resonators 430) may be adjusted in order to tune the resonant frequency of each resonant cavity 420. Additional tuning screws 462 (or other tuning elements) are provided that can be used to adjust the magnitudes of the main couplings. Each tuning screw 462 may be adjusted to extend a desired distance into the cavity 414 in order to tune various aspects of the electrical response of the bandpass filter 400. An outer cover (not shown) may be mounted above the inner cover to cover the portions of the tuning screws 462 that extend outside the cavity 414.

A total of four resonant cavities 420 are included in filter 400, which are referred to herein as first through fourth resonant cavities 420-1 through 420-4. Each resonant cavity 420 is defined by the floor 452, outer sidewalls 454, inner sidewalls 456 and inner cover (not shown). Respective first through fourth resonators 430-1 through 430-4 are mounted in resonant cavities 420-1 through 420-4. Each resonator 430 may be mounted to extend upwardly from the floor 452 and may be positioned in approximately the center of its respective resonant cavity 420. The resonators 430 may be implemented, for example, as dielectric TE01 or TM resonators or as metal TEM resonators.

Windows 458 are formed in some of the inner walls 456. The windows 458 are not visible in the view of FIG. 7, but are formed in the inner walls 456 at the locations where the arrows 458 in FIG. 7 point. The windows 458 allow the resonators 430 in adjacent ones of the resonant cavities 420 to couple with each other. The windows 458 are used to implement the main couplings of bandpass filter 400 as well as the cross-coupling between the first and fourth resonant cavities 420-1, 420-4 (if provided).

An RF input 410 extends through one of the outer walls 454 into the first resonant cavity 420-1. In the depicted embodiment, the RF input 410 is a stripline transmission line. When the bandpass filter 400 is implemented as part of a low-loss combiner within a housing of the low-loss combiner, the input stripline transmission line 410 may be connected to, or integral with, another transmission line of the combiner. When the bandpass filter 400 is implemented as a standalone unit, a coaxial connector (not shown) may be mounted in the outer wall 454 and a center contact of the coaxial connector (which contacts the center conductor of a mating input coaxial cable) may be connected to the input stripline transmission line 410, and an outer contact of the coaxial connector (which contacts the outer conductor of the mating input coaxial cable) may be electrically connected to the housing 450. In other embodiments, an opening may be formed in the outer wall 454 and a center conductor of a mating input coaxial cable may be soldered or otherwise connected to the input stripline transmission line 410. The input stripline transmission line 410 may extend close to the first resonator 430-1 to couple with the first resonator 430-1.

An RF output 412 extends through another one of the outer walls 454 into the fourth resonant cavity 420-4. In the depicted embodiment, the RF output is a stripline transmission line. When the bandpass filter 400 is implemented as part of a low-loss combiner within a housing of the low-loss combiner, the output stripline transmission line 412 may be connected to, or integral with, another transmission line of the combiner. When the bandpass filter 400 is implemented as a standalone unit, the outer wall 454 may include an opening for receiving an output coaxial cable or may have an output coaxial connector (not shown) that may be identical to the above-described input coaxial connector. The output stripline transmission line 412 may extend close to the fourth resonator 430-4 to couple with the fourth resonator 430-4.

The filter 400 includes a coupling element 440 that is similar to the coupling element 300 depicted in FIG. 6, but the coupling element 440 is implemented as a two piece coupling element. As shown in FIG. 7, the coupling element 440 includes a pair of conductive strip lines 442-1, 442-2 that each have enlarged ends 444 that include openings (not visible in FIG. 7). Fixing screws 466 are inserted through the openings in the ends 444 of the conductive strip lines 442-1, 442-2 in order to affix each conductive strip line 442-1, 442-2 to the housing 450 and to electrically ground the ends of each conductive strip line 442-1, 442-2 (since the housing 450 is electrically grounded when the bandpass filter 400 operates).

The first conductive strip line 442-1 extends between the first and third resonant cavities 420-1, 420-3, while the second conductive strip line 442-2 extends between the second and fourth resonant cavities 420-2, 420-4. Each conductive strip line 442-1, 442-2 has a curved shape (a general S-shape in the depicted embodiment). Each conductive strip line 442-1, 442-2 includes a respective cross-over portion where the two strip lines 442-1, 442-2 cross over each other. The conductive strip lines 442-1, 442-2 are spaced apart from each other so that they do not physically contact each other. Tuning screws 464 are provided that are mounted in the internal cover (not shown). The tuning screws 464 may be used to adjust the cross-couplings between the first and third resonant cavities 420-1, 420-3 and between the second and fourth resonant cavities 420-2, 420-4.

The conductive strip lines 442-1, 442-2 are designed so that the magnitude of the coupling between the first resonant cavity 420-1 and the third resonant cavity 420-3 will be substantially equal to the magnitude of the coupling between the second resonant cavity 420-2 and the fourth resonant cavity 420-4. In this context, "substantially equal" means the magnitude of the couplings is within 10%. In other embodiments, the magnitude of the two couplings may be within 7%, within 5%, within 3% or within 1%.

While the ends 444 of the conductive strip lines 442-1, 442-2 are fixed to the housing 450 and hence electrically grounded in the embodiment shown in FIG. 7, it will be appreciated that in other embodiments the conductive strip lines 442-1, 442-2 may instead be electrically floating.

It will be appreciated that many modifications may be made to the filter 400 without departing from the scope of the present invention. For example, the locations of the resonant cavities 420 or the location of the resonators 430 within the resonant cavities 420 may be changed. As another example, different types of resonators 430 may be used, and the input 410 and output 412 may have any conventional port design. The internal cover (not shown) may be soldered in place rather than fixed using screws, and any appropriate type of tuning elements may be used.

FIG. 8 is a top view of a low-loss combiner 500 according to embodiments of the present invention (with the cover removed) that includes two of the bandpass filters 530-1, 530-2 that each have the design of bandpass filter 400 of FIG. 7. The device shown in FIG. 8 represents one-half of a dual low-loss combiner that includes first and second low-loss combiners in a common housing.

As can be seen in FIG. 8, the low-loss combiner 500 includes a first frequency selective port 512, a second frequency selective port 514, a common port 516 and a resistive termination 518. The combiner 500 further includes a pair of 90° hybrid couplers 520-1, 520-2 and a pair of bandpass filters 530-1, 530-2 that are each implemented as the bandpass filter 400 of FIG. 7. The first frequency selective port 512, the second frequency selective port 514 and the common port 516 are implemented as openings (not visible) in the housing 550 of combiner 500. Coaxial cables (not shown) may be inserted through these openings and electrically connected to respective ones of first through third RF transmission lines 540-1 through 540-3 within the combiner 500. The end of the center conductor of each coaxial cable is shown in FIG. 8 for purposes of reference. A fourth transmission line 540-4 electrically connects a port of the second 90° hybrid coupler 520-2 to the resistive termination 518. The bandpass filters 530-1, 530-2 are coupled between the 90° hybrid couplers 520-1, 520-2 in the same fashion as the conventional combiner 10 discussed above with reference to FIG. 1.

The low-loss combiner 500 may have less sensitivity to differences in the resonant frequencies of the two second resonant cavities and in the two third resonant cavities of the bandpass filters 530-1, 530-2. As discussed above with reference to FIGS. 3 and 5, this may improve the isolation performance of the combiner 500 as compared to the conventional combiner 10 of FIG. 1. Additionally, since the bandpass filters 530-1, 530-2 included in combiner 500 have cross-couplings between both the first and third resonant cavities 420-1, 420-3 and between the second and fourth resonant cavities 420-2, 420-4, the magnitude of each of these cross-couplings may be less than the magnitude of the cross-coupling between the first and third resonant cavities 120-1, 120-3 in the bandpass filters 100 included in the conventional combiner 10 of FIG. 1. This may be advantageous as it may be difficult to physically implement filters that require strong cross-couplings, particularly when the filter is designed to operate at higher and/or wider frequency bands. Moreover, the filters and low-loss combiners according to embodiments of the present invention may exhibit increased power handling capabilities as compared to the conventional filters and low-loss combiners discussed herein.

Figure 9:
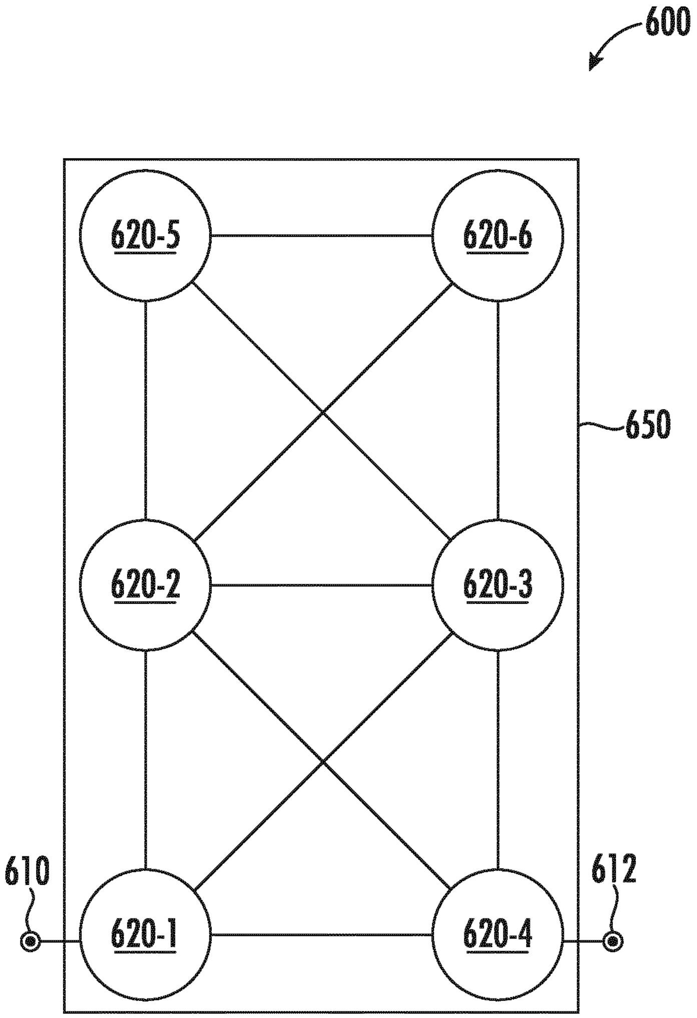
FIG. 9 is a schematic diagram illustrating a design of a bandpass filter according to further embodiments of the present invention.

FIG. 9 is a schematic diagram illustrating a design of a bandpass filter 600 according to further embodiments of the present invention. The bandpass filter 600 includes an input 610, an output 612 and first through sixth resonant cavities 620-1 through 620-6 that are formed within a housing 650 and coupled between the input 610 and the output 612. The bandpass filter 600 is similar to the bandpass filter 200 of FIG. 4, but includes two additional resonant cavities 620-5, 620-6 (and associated resonators). Thus, the description of bandpass filter 600 will focus only on the differences from bandpass filter 200 of FIG. 4.

The fifth and sixth resonant cavities 620-5, 620-6 are part of the main coupling path and are interposed along the main coupling path between resonant cavities 620-2 and 620-3. Respective coupling windows may be formed in inner walls of the housing that separate the second resonant cavity 620-2 from the fifth resonant cavity 620-5, separate the fifth resonant cavity 620-5 from the sixth resonant cavity 620-6, and separate the sixth resonant cavity 620-6 from the third resonant cavity 620-3. The filter 600 further includes two additional cross-couplings, namely a cross-coupling between the second and sixth resonant cavities 620-2, 620-6 and a cross-coupling between the third and fifth resonant cavities 620-3, 620-5. Additionally, the coupling between the second and third resonant cavities 620-2, 620-3 is a cross-coupling in filter 600. The filter 600 may generate at least four transmission zeros. Moreover, the cross-coupling between the second and third resonant cavities 620-2, 620-3 and/or the cross-coupling between the first and fourth resonant cavities 620-1, 620-4 may be omitted in further embodiments.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A filter, comprising:

first through fourth resonant cavities;

an input that extends into the first resonant cavity; and an output that extends from the fourth resonant cavity, wherein the first resonant cavity is configured to couple with the second and third resonant cavities, the second resonant cavity is configured to couple with the third and fourth resonant cavities, and the third resonant cavity is configured to couple with the fourth resonant cavity, and wherein a magnitude of the coupling between the first and third resonant cavities is configured to be substantially equal to a second magnitude of the coupling between the second and fourth resonant cavities, the filter further comprising a fifth resonant cavity and a sixth resonant cavity, wherein the second resonant cavity is configured to couple with the fifth and sixth resonant cavities, and the third resonant cavity is also configured to couple with the fifth and sixth resonant cavities.

2. A filter, comprising:

a housing having outer sidewalls that define a rectangle;

first through fourth resonant cavities that are within the housing and positioned at the four corners of the rectangle defined by the outer sidewalls of the housing;

an input that extends into the first resonant cavity; and an output that extends from the fourth resonant cavity, wherein the first resonant cavity is configured to couple with the second and third resonant cavities, the second resonant cavity is configured to couple with the third and fourth resonant cavities, and the third resonant cavity is configured to couple with the fourth resonant cavity, and wherein a magnitude of the coupling between the first and third resonant cavities is configured to be substantially equal to a second magnitude of the coupling between the second and fourth resonant cavities wherein the first and third resonant cavities are arranged at opposed corners of the rectangle defined by the outer sidewalls of the housing.

3. A filter, comprising:

first through fourth resonant cavities;

an input that extends into the first resonant cavity; and an output that extends from the fourth resonant cavity, wherein the first resonant cavity is configured to couple with the second and third resonant cavities, the second resonant cavity is configured to couple with the third and fourth resonant cavities, and the third resonant cavity is configured to couple with the fourth resonant cavity, and wherein a magnitude of the coupling between the first and third resonant cavities is configured to be substantially equal to a second magnitude of the coupling between the second and fourth resonant cavities further comprising a coupling element that comprises a first conductive line that extends between the first and third resonant cavities and a second conductive line that extends between the second and fourth resonant cavities.

4. The filter of claim 3, wherein the first resonant cavity is further configured to couple with the fourth resonant cavity.

5. The filter of claim 4, wherein the first through fourth resonant cavities generally define a rectangle.

6. The filter of claim 3, wherein each of the first and second conductive lines includes first and second end portions that are electrically coupled to the housing.

7. The filter of claim 3, wherein the first resonant cavity is configured to couple with the second resonant cavity through a first coupling window, the second resonant cavity is configured to couple with the third resonant cavity through a second coupling window, and the third resonant cavity is configured to couple with the fourth resonant cavity through a third coupling window.

8. The filter of claim 7, wherein the first resonant cavity is configured to couple with the third resonant cavity via a first conductive coupling line, and the second resonant cavity is configured to couple with the fourth resonant cavity via a second conductive coupling line.

9. A combiner that includes the filter of claim 7, the combiner further comprising:

a first frequency selective port;

a second frequency selective port;

a common port;

a termination;

a first hybrid coupler coupled between the first frequency selective port and the common port; and a second hybrid coupler coupled between the second frequency selective port and the termination, wherein the filter is a bandpass filter that is coupled between the first hybrid coupler and the second hybrid coupler.

10. The combiner of claim 9, wherein the bandpass filter is a first bandpass filter, the combiner further comprising a second bandpass filter coupled between the first hybrid coupler and the second hybrid coupler.

11. The combiner of claim 10, wherein the first and second bandpass filters have substantially the same design and have substantially the same pass bands.

12. A filter, comprising:

first through fourth resonant cavities;

first through fourth resonators mounted in the respective first through fourth resonant cavities, where the first resonator is closer to the second and fourth resonators than it is to the third resonator and the second resonator is closer to the first and third resonators than it is to the fourth resonator;

an input that is configured to feed RF signals from a first external circuit element into the first resonant cavity;

an output that is configured to pass RF signals from the fourth resonant cavity to a second external circuit element; and a coupling element that extends between the first and third resonant cavities and between the second and fourth resonant cavities.

13. The filter of claim 12, further comprising a housing having walls that define the first through fourth resonant cavities, wherein a first coupling window is formed in a first wall that separates the first resonant cavity from the second resonant cavity, a second coupling window is formed in a second wall that separates the second resonant cavity from the third resonant cavity, and a third coupling window is formed in a third wall that separates the third resonant cavity from the fourth resonant cavity.

14. The filter of claim 13, wherein a magnitude of coupling between the first and third resonant cavities is configured to be substantially equal to a second magnitude of coupling between the second and fourth resonant cavities.

15. A combiner that includes the filter of claim 12, the combiner further comprising:

a first frequency selective port;

a second frequency selective port;

a common port;

a termination;

a first hybrid coupler coupled between the first frequency selective port and the common port; and a second hybrid coupler coupled between the second frequency selective port and the termination, wherein the filter is a bandpass filter that is coupled between the first hybrid coupler and the second hybrid coupler.

16. The combiner of claim 15, wherein the bandpass filter is a first bandpass filter, the combiner further comprising a second bandpass filter coupled between the first hybrid coupler and the second hybrid coupler, wherein the first and second bandpass filters have substantially the same design and have substantially the same pass bands.

17. A combiner, comprising:

a first frequency selective port;

a second frequency selective port;

a common port;

a termination;

a first bandpass filter that is to the coupled to the first frequency selective port, the second frequency selective port and the common port; and a second bandpass filter that is to the coupled to the first frequency selective port, the second frequency selective port and the common port;

a first hybrid coupler coupled between the first frequency selective port and the common port; and a second hybrid coupler coupled between the second frequency selective port and the termination, wherein the first and second bandpass filters are each coupled between the first hybrid coupler and the second hybrid coupler, wherein the first and second bandpass filters each include an input, an output and first through fourth resonant cavities, where the first resonant cavity is configured to couple with the input and the second and third resonant cavities, the second resonant cavity is configured to couple with the third and fourth resonant cavities, and the fourth resonant cavity is configured to couple with the third resonant cavity and the output, and wherein a first conductive coupling element extends between the first and third resonant cavities, and a second conductive coupling element extends between the second and fourth resonant cavities.

18. The combiner of claim 17, wherein a magnitude of the coupling between the first and third resonant cavities in the first bandpass filter is configured to be substantially equal to a magnitude of the coupling between the second and fourth resonant cavities of the first bandpass filter.

19. The combiner of claim 17, wherein the first resonant cavity is further configured to couple with the fourth resonant cavity.

20. The combiner of claim 17, wherein the first through fourth resonant cavities generally define a rectangle, and the first and third resonant cavities are arranged at opposed corners of the rectangle.

21. The combiner of claim 17, wherein the first and second bandpass filters have substantially the same design and have substantially the same pass bands.

* * * * *